Oct. 3, 1950     T. J. SCUTTISH     2,524,298
PEDAL TESTING DEVICE
Filed Nov. 6, 1945     2 Sheets—Sheet 2
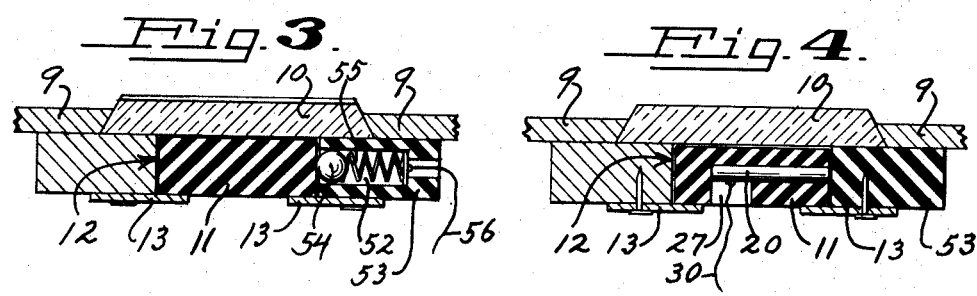
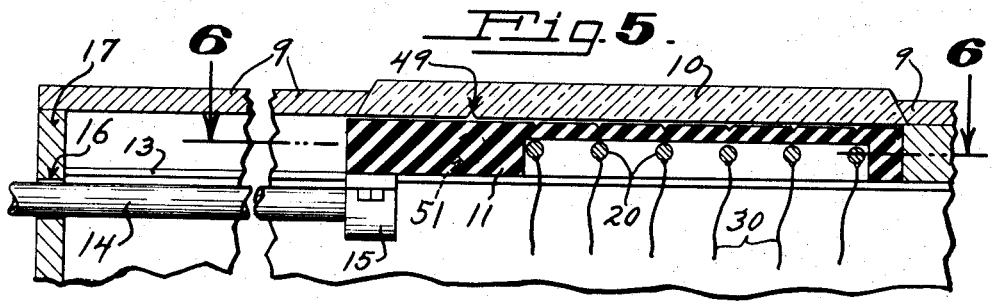
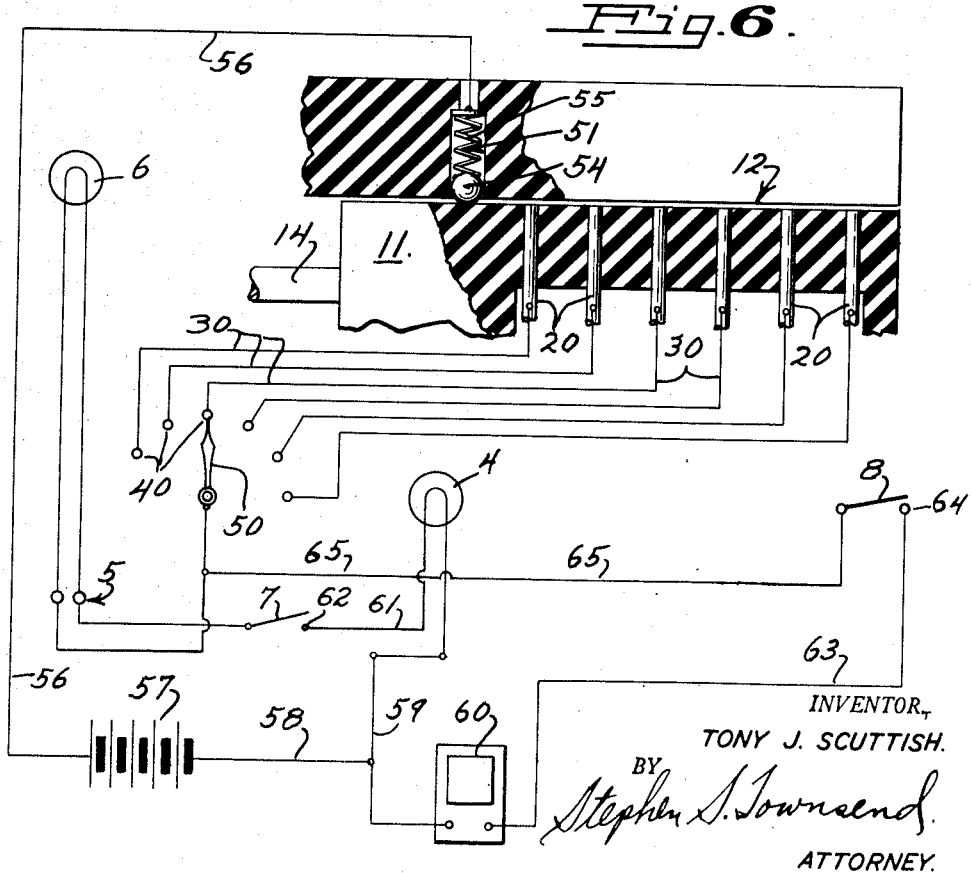
INVENTOR,
TONY J. SCUTTISH.
BY Stephen S. Townsend
ATTORNEY.

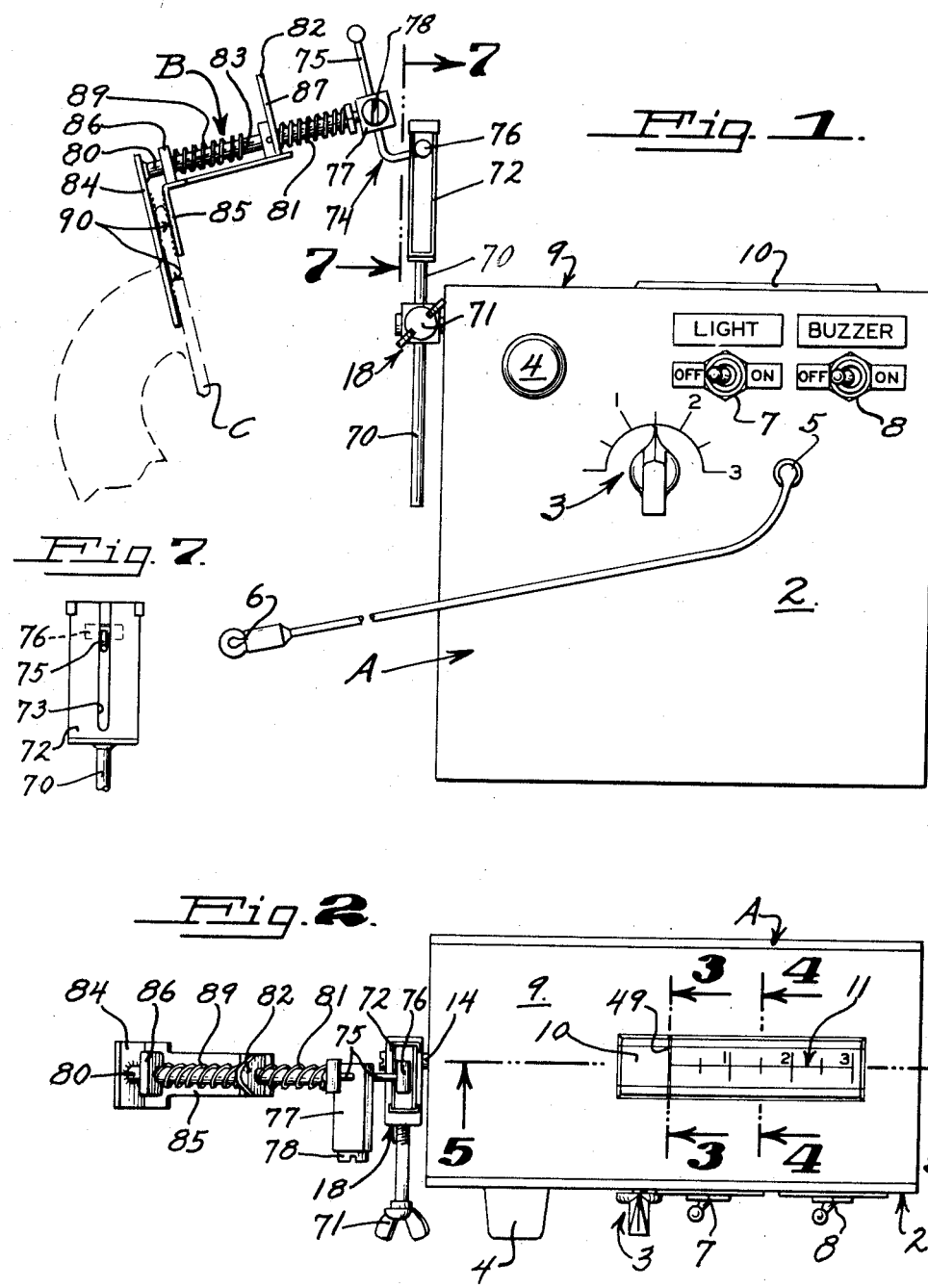

Patented Oct. 3, 1950

2,524,298

UNITED STATES PATENT OFFICE 2,524,298

PEDAL TESTING DEVICE

Tony J. Scuttish, Pacific Grove, Calif.

Application November 6, 1945, Serial No. 626,927

3 Claims. (Cl. 33—125)

This invention relates to testing devices, and more particularly to a testing device for measuring the free play travel of automotive clutch and brake pedals, and the like.

A major cause of clutch and transmission failure in automotive vehicles is the improper adjustment of the clutch pedal control, as when too much or too little free travel or free play is allowed the control pedal before engagement. The manufacturer of each standard make of automobile, for example, has prescribed more or less critical measurement in inches of the proper free travel of clutch pedals before clutch action for each make of automobile. Similarly, a major reason for brake failure is the improper adjustment of the free travel of the brake control pedals. Heretofore, the method of adjusting the free travel of the pedal has been more or less hit or miss by a so-called touch system or by guesswork.

An object of this invention is to provide a pedal testing device, whereby the free play or free travel of a pedal, such as an automotive brake or clutch pedal, may be accurately measured. A further object is to provide a pedal testing device which may be pre-set, by an operator, for the proper adjustment of a given pedal. Another object is to provide a pedal testing device, wherein the operator is apprised by signal, visual and/or audible, as to the prescribed adjustment of the pedal and the relation between the said prescribed adjustment and the actual pedal adjustment.

Further objects of the invention are to provide a gauged testing device for measurement of free travel or free play in pedals or the like which is portable and capable of use by relatively untrained personnel; to provide a device of the character described which is compartively simple and inexpensive to manufacture and compact in structural design; and to provide a testing device of the character described which takes the guesswork out of pedal free travel adjustment.

Other objects and advantages will become apparent upon reference to the accompanying specification and drawings.

Referring to the drawings, in which similar characters of reference represent corresponding parts in the several views:

Fig. 1 is a side elevational view of the invention shown operatively attached to a pedal illustrated fragmentarily in broken lines.

Fig. 2 is a top plan view of the invention.

Fig. 3 is a view, taken on line 3—3 of Fig. 2.

Fig. 4 is a view, taken on line 4—4 of Fig. 2.

Fig. 5 is a view, taken on line 5—5 of Fig. 2.

Fig. 6 is a view, taken on line 6—6 of Fig. 5, and showing a circuit diagram of the electric wiring and connections.

Fig. 7 is a view, taken on line 7—7 of Fig. 1.

The invention consists of a control box, generally indicated at A, and a pedal connecting mechanism, generally indicated at B. A pedal is indicated at C.

The control box A comprises a rectangular box adapted to be placed on the floor-boards of an automotive vehicle adjacent to the pedal C to be tested. The connecting mechanism B is then affixed to the pedal. The control box is provided with a front panel 2 having a selector dial 3, a panel light 4, an extension cord electric socket 5 for the reception of a plug and attached cable and light bulb 6, a light switch 7, and a buzzer switch 8.

The top 9 of the box A is provided with a window 10, below which is positioned a gauge 11, formed of an electric insulating material, and in the form of a measuring stick, graduated in inches and fractions thereof and slidable longitudinally in a channel 12 provided under the window 10 and extending longitudinally of the top 9. Tracks 13 project from the portions of the box top 9 which define the gauge channel 12 and support the slidable gauge. A rod 14 is suitably rigidly affixed to the gauge member 11, as at 15. The rod 14 extends through an aperture 16 provided in a side 17 of the box adjacent to the top thereof and is slidable in said aperture longitudinally of the box. The outer end of rod 14 is provided with a clamp, generally indicated at 18, for a purpose hereinafter described.

The gauge member 11 is provided with a plurality of electric contacts 20, positioned in transverse bores provided in said gauge member, one end of each contact being approximately flush with a side edge of the gauge member. A groove 27 is provided in the bottom of gauge 11 for access of appropriate electric lead wires 30, suitably attached to said contacts and which, in turn, lead to electric switch contacts 40, which are positioned to correspond with the graduations of selector dial 3. Selector switch contact 50 is operated by dial 3.

The gauge contacts 20, provided in the gauge member 11, are spaced from one another according to the inch scale on the top face of the gauge member and to correspond with the calibrations of selector dial 3. It is noted that the drawings illustrate a half inch scale, whereas in practice the scale is usually by the quarter inch. Obviously any scale may be utilized. A stationary electrode, generally indicated at 51, is provided in a transverse bore 52 provided in portion 53 of box top 9 which defines the gauge channel 12 and is in vertical alignment with a point 49 on the box top which indicates zero on the scale when the gauge is in fully retracted position. In such position the point 49 would be one measure of the scale removed from the first indicating mark, as in the drawings one-half inch removed from the one-half inch mark when the gauge is in fully retracted position.

Portion 53 is formed of an electric insulating material. Electrode 51 comprises a metal conductor member 54, having a camming surface, such as a ball bearing, and a coil spring 55 formed of electric conductor material. An electric lead wire 56 is appropriately connected to the conductor spring 55 which, in turn, contacts member 54 and urges member 54 against gauge member 12. Lead 56 is connected to one side of an electric current source 57, usually a dry cell battery.

Line 61 is a common lead through extension socket 5 to stationary contact 62 of light switch 7. Line 63 is connected to buzzer 60 and leads to stationary contact 64 of buzzer switch 8.

Panel light 4 is connected between line 61 and line 59.

Hence it is seen that when the buzzer switch 8 is closed, the buzzer circuit is closed through switch selector member 50, a contact 40, a lead 30, and by registry of stationary electrode 51 with an appropriate gauge contact 20, to line 56 connected to current source 57. The rest of the closed buzzer circuit is through lines 58, buzzer 60, line 63, through switch 8, line 65 to the selector 50.

The panel light and signal light circuits are closed to the lefthand side of the battery 57 in the same manner as has been described above relative to the buzzer circuit. The circuit is closed to the right hand terminal of the battery from selector 50 through extension socket 5, light 6, lead 61, light switch 7, stationary contact 62, light 4, lead 59, and lead 58. Obviously, the circuit connections may be altered or modified to give any variation or combination of audible or visual signals simultaneously or selectively.

The means for connecting the gauge member 11, through reciprocal rod 14, to a pedal C will now be described. Rod 14 is provided with a clamp, generally indicated at 18, adapted to receive slidably and rotatably a rod 70. A set screw 71 is provided in clamp 18 to hold the rod 70 in a fixed position. Rod 70 is provided with an open-ended channel guideway portion 72 in the form of a hollow rectangular box portion, provided with a longitudinal slot 73 for slidable engagement with a connector member 74. Connector member 74 comprises a shank portion 75, bent at right angles and formed with a rounded, enlarged portion 76, adapted to travel in the guideway portion 72 of rod 70. The shank portion is carried in a clamp member 77, provided with a set screw 78 to impart enough pressure on shank portion 75 to prevent undesired movement thereof.

Clamp 77 is carried by a shaft 80, provided with a coil tension spring 81 interposed between clamp 77 and a pedal clamp finger-hold 82 slidably mounted on shaft 80. A stop member 83, such as a pin, is rigidly attached to the shaft member approximately midway thereof. A flat piece of steel or other material 84 is rigidly attached to the end of shaft 80, depending at right angles to the longitudinal axis thereof to form a rigid portion of the pedal clamp. A flat movable contact portion 85 of the pedal clamp depends at right angles from the longitudinal axis of shaft 80 parallel to member 84 and is adapted to reciprocate on shaft 80 by means of bearings 86 and 87 spaced from one another by space bar 88. A coil tension spring 89 is interposed between stop member 83 and bearing 86.

The contact faces of members 84 and 85 are suitably knurled, as at 90, in order adequately to grip the pedal faces, usually formed of steel. I have found that alternate rows of oppositely inclined punch marks which produce oppositely inclined burrs is eminently satisfactory.

I have found that the structure of connecting or link mechanism B is extremely accurate for causing the slidable gauge member 11 to move horizontally a distance equal to the horizontal component of arcuate displacement of the pedal. Similarly the enlarged portion 76 of shank 75 which forms a part of connecting or link mechanism B is caused to move vertically a distance equal to the vertical component of arcuate displacement of the pedal.

The manner of operation of the device will now be described. The control box A is positioned on the floor-boards of the automotive vehicle behind the pedal C to be tested. The connecting mechanism B is connected to the pedal by clamp members 84 and 85. Dial 3 is pre-set in accordance with the appropriate free play of the pedal to be tested. The pedal is depressed until the visual or buzzer signal operates, at which point the pedal is adjusted. For example, if the pedal has more free play than is proper, a signal is sounded or seen when the proper adjustment point is reached before engagement is made and the mechanic can tell that he must take up some of the play. On the other hand, if the pedal takes hold or engages prior to the signal warning, the mechanic is apprised of the fact that he must adjust the pedal to provide more free travel.

While the invention has been described in more or less specific detail for purposes of clarity of description, it is understood that modifications and variations in detail of structure may be accomplished within the scope of the appended claims.

I claim:

1. In a pedal testing device the combination comprising a slidable gauge mounted on a support member positioned stationary relative to an arcuately movable pedal, link means connecting said gauge to said pedal adapted to move slidably said gauge a distance equal to the horizontal component of arcuate displacement of said pedal during movement thereof, said link means including a spring biased pedal clamp, a vertically disposed guideway, and a guide member mounted on said pedal clamp and adapted to slide vertically in said guideway a distance equal to the vertical component of arcuate displacement of said pedal during movement thereof.

2. In a pedal testing device the combination comprising a slidable gauge mounted on a support member positioned stationary relative to an arcuately movable pedal, link means connecting said gauge to said pedal adapted to move slidably said gauge a distance equal to the horizontal component of arcuate displacement of said pedal during movement thereof, said link means including a pedal clamp, a vertically disposed guideway, and a guide member mounted on said pedal clamp and adapted to slide vertically in said guideway a distance equal to the vertical component of arcuate displacement of said pedal during movement thereof.

3. In combination with an arcuately movable pedal supported pivotally about a horizontally disposed axis a pedal testing device comprising, a horizontally disposed gauge member mounted slidably in a support member positioned stationary with respect to said pedal, link means connecting the free end of said pedal with said slidable gauge to move the latter a distance equal to the horizontal component of arcuate displacement of said free end of said pedal during movement thereof, said link means comprising a pedal clamp, a vertically disposed member, and an element mounted for vertical slidable movement with respect to said vertically disposed member a distance equal to the vertical component of arcuate displacement of the free end of said pedal during movement thereof.

TONY J. SCUTTISH.

REFERENCES CITED

The following references are of record in the file of this patent:

UNITED STATES PATENTS

| Number | Name | Date |
| --- | --- | --- |
| 535,224 | Schopper | Mar. 5, 1895 |
| 925,674 | Austin | June 22, 1909 |
| 1,740,255 | Lovelace | Dec. 17, 1929 |
| 1,901,292 | Graham | Mar. 14, 1933 |
| 2,047,408 | Emery et al. | July 14, 1936 |